(12) United States Patent
Walker et al.

(10) Patent No.: US 10,507,914 B2
(45) Date of Patent: Dec. 17, 2019

(54) SPOOLER FOR UNMANNED AERIAL VEHICLE SYSTEM

(71) Applicant: FLIR DETECTION, INC., Stillwater, OK (US)

(72) Inventors: Jason S. Walker, Medford, MA (US); John W. Ware, Brookline, MA (US); Samuel A. Johnson, Loveland, CO (US); Andrew M. Shein, Winchester, MA (US)

(73) Assignee: FLIR DETECTION, INC., Stillwater, OK (US)

(*) Notice: Subject to any disclaimer, the term of this patent is extended or adjusted under 35 U.S.C. 154(b) by 0 days.

(21) Appl. No.: 15/041,211

(22) Filed: Feb. 11, 2016

(65) Prior Publication Data

US 2017/0008626 A1    Jan. 12, 2017

Related U.S. Application Data

(63) Continuation of application No. 13/838,399, filed on Mar. 15, 2013, now Pat. No. 9,290,269.

(51) Int. Cl.
*B64C 39/02* (2006.01)
*H02G 11/02* (2006.01)
(Continued)

(52) U.S. Cl.
CPC .......... *B64C 39/022* (2013.01); *B64C 39/024* (2013.01); *B64D 47/08* (2013.01); *B64F 3/00* (2013.01); *H02G 11/02* (2013.01); *B64C 2201/027* (2013.01); *B64C 2201/127* (2013.01); *B64C 2201/148* (2013.01);
(Continued)

(58) Field of Classification Search
CPC ..... B64C 39/022; B64C 39/024; B64D 47/08; B64F 3/00; H02G 11/02
See application file for complete search history.

(56) References Cited

U.S. PATENT DOCUMENTS 2,995,740 A    8/1961    Shreckengost
2,996,269 A    8/1961    Parry
(Continued)

FOREIGN PATENT DOCUMENTS

CN    202807086 U    3/2013
CN    202953185 U    5/2013
(Continued)

OTHER PUBLICATIONS

Borys, "StableEyes" Tethered Hovering Platform Development. Thesis, Submitted to the graduate degree program in Aerospace Engineering and the Faculty of the Graduate School of the University of Kansis in partial fulfillment of the requirements for the degree of Master's of Science. 150 pages, (2008).
(Continued)

*Primary Examiner* — Justin M Benedik
(74) *Attorney, Agent, or Firm* — Haynes and Boone, LLP

(57) ABSTRACT

In an aspect, in general, a spooling apparatus includes a filament feeding mechanism for deploying and retracting filament from the spooling apparatus to an aerial vehicle, an exit geometry sensor for sensing an exit geometry of the filament from the spooling apparatus, and a controller for controlling the feeding mechanism to feed and retract the filament based on the exit geometry.

43 Claims, 11 Drawing Sheets

(51) Int. Cl.
*B64F 3/00* (2006.01)
*B64D 47/08* (2006.01)

(52) U.S. Cl.
CPC .. *B64C 2201/201* (2013.01); *B64C 2201/203* (2013.01); *B64C 2201/208* (2013.01)

(56) References Cited

U.S. PATENT DOCUMENTS

| | | | |
|---|---|---|---|
| 3,053,480 A | 9/1962 | Vanderlip | |
| 3,053,481 A | 9/1962 | Wyatt | |
| 3,149,803 A | 9/1964 | Petrides | |
| 3,176,288 A | 3/1965 | Wyatt | |
| 3,176,413 A | 4/1965 | Dornier et al. | |
| 3,181,816 A | 5/1965 | Pfleiderer | |
| 3,217,097 A | 11/1965 | Pauli et al. | |
| 3,223,358 A | 12/1965 | Quick | |
| 3,223,359 A | 12/1965 | Quick et al. | |
| 3,228,629 A | 1/1966 | Garner | |
| 3,241,145 A | 3/1966 | Petrides | |
| 3,381,922 A | 5/1968 | Laing | |
| 3,496,469 A | 2/1970 | Ebbs-Canavan et al. | |
| 3,611,367 A | 10/1971 | Billottet et al. | |
| 3,618,259 A | 11/1971 | Wigal | |
| 3,710,006 A | 1/1973 | Davis | |
| 3,717,719 A | 2/1973 | Smith et al. | |
| 3,919,805 A | 11/1975 | Stanzel | |
| 3,943,357 A | 3/1976 | Culver | |
| 3,991,512 A | 11/1976 | Stanzel | |
| 4,058,277 A | 11/1977 | Kozakiewicz et al. | |
| 4,095,759 A | 6/1978 | Woitschella et al. | |
| 4,133,139 A | 1/1979 | Stanzel | |
| 4,161,843 A | 7/1979 | Hui | |
| 4,233,605 A | 11/1980 | Coleman | |
| 4,478,379 A | 10/1984 | Kerr | |
| 4,508,934 A | 4/1985 | Feldman, Jr. | |
| 4,573,937 A | 3/1986 | Stanzel | |
| 4,664,340 A | 5/1987 | Jackson | |
| 4,795,111 A | 1/1989 | Moller | |
| 4,799,914 A | 1/1989 | Hutchinson | |
| 4,808,999 A | 2/1989 | Toman | |
| 4,842,221 A | 6/1989 | Beach et al. | |
| 4,999,640 A | 3/1991 | Wheeler | |
| 5,070,955 A | 12/1991 | Lissaman et al. | |
| 5,072,396 A | 12/1991 | Fitzpatrick et al. | |
| 5,115,997 A | 5/1992 | Peterson | |
| 5,120,905 A | 6/1992 | Cousin et al. | |
| 5,136,295 A | 8/1992 | Bull et al. | |
| 5,152,478 A | 10/1992 | Cycon et al. | |
| 5,208,757 A | 5/1993 | Appriou et al. | |
| 5,260,820 A | 11/1993 | Bull et al. | |
| 5,289,994 A | 3/1994 | Del Campo Aguilera | |
| 5,334,070 A | 8/1994 | Yu et al. | |
| 5,419,513 A | 5/1995 | Flemming, Jr. et al. | |
| 5,525,883 A | 6/1996 | Avitzour | |
| 5,709,580 A | 1/1998 | Stanzel | |
| 5,722,618 A | 3/1998 | Jacobs et al. | |
| 5,752,088 A | 5/1998 | Desselle | |
| 5,757,157 A | 5/1998 | Falk et al. | |
| 5,765,783 A | 6/1998 | Albion | |
| 5,779,190 A | 7/1998 | Rambo et al. | |
| 5,904,724 A | 5/1999 | Margolin | |
| 6,010,093 A | 1/2000 | Paulson | |
| 6,086,014 A | 7/2000 | Bragg, Jr. | |
| 6,104,970 A | 8/2000 | Schmidt, Jr. et al. | |
| 6,270,038 B1 | 8/2001 | Cycon et al. | |
| 6,325,330 B1 | 12/2001 | Lavan, Jr. | |
| 6,364,253 B1 | 4/2002 | Cavanagh | |
| 6,384,765 B1 | 5/2002 | Sjostrand et al. | |
| 6,389,194 B1 | 5/2002 | Passman | |
| 6,419,190 B1 | 7/2002 | Nguegang | |
| 6,422,506 B1 | 7/2002 | Colby | |
| 6,427,944 B1 | 8/2002 | Passman | |
| 6,450,445 B1 | 9/2002 | Moller | |
| 6,450,452 B1 | 9/2002 | Spencer et al. | |
| 6,502,787 B1 | 1/2003 | Barrett | |
| 6,542,109 B2 | 4/2003 | Lloyd et al. | |
| 6,567,044 B2 | 5/2003 | Carroll | |
| 6,620,018 B1 | 9/2003 | Chao et al. | |
| 6,672,543 B2 | 1/2004 | Carlson et al. | |
| 6,683,555 B2 | 1/2004 | Carlson et al. | |
| 6,705,573 B2 | 3/2004 | McDonnell | |
| 6,804,495 B2 | 10/2004 | Duthie | |
| 6,811,113 B1 | 11/2004 | Silansky et al. | |
| 6,845,939 B1 | 1/2005 | Baldwin | |
| 6,857,596 B1 | 2/2005 | Carlson | |
| 6,868,314 B1 | 3/2005 | Frink | |
| 6,874,729 B1 | 4/2005 | McDonnell | |
| 6,931,247 B2 | 8/2005 | Cox et al. | |
| 6,933,965 B2 | 8/2005 | Heafitz | |
| 7,039,367 B1 | 5/2006 | Kucik | |
| 7,040,247 B2 | 5/2006 | Chouery | |
| 7,097,137 B2 | 8/2006 | McDonnell | |
| 7,183,663 B2 * | 2/2007 | Roberts | G05D 1/0866 290/44 |
| 7,210,654 B1 | 5/2007 | Cox et al. | |
| 7,264,204 B1 | 9/2007 | Portmann | |
| 7,287,723 B2 | 10/2007 | Barnes | |
| 7,296,530 B1 | 11/2007 | Bernstein et al. | |
| 7,364,114 B2 | 4/2008 | Wobben | |
| 7,410,125 B2 | 8/2008 | Steele | |
| 7,506,837 B2 | 3/2009 | Parks | |
| 7,510,142 B2 | 3/2009 | Johnson | |
| 7,520,463 B2 | 4/2009 | Lepine et al. | |
| 7,520,466 B2 | 4/2009 | Bostan | |
| 7,530,527 B2 | 5/2009 | Kelleher | |
| 7,530,787 B2 | 5/2009 | Bertolotti et al. | |
| 7,552,894 B2 | 6/2009 | Barnes | |
| 7,556,219 B2 | 7/2009 | Page et al. | |
| 7,559,191 B2 | 7/2009 | Parks | |
| 7,631,834 B1 | 12/2009 | Johnson et al. | |
| 7,665,691 B2 | 2/2010 | Hanzlick et al. | |
| 7,708,222 B2 | 5/2010 | Lee | |
| 7,712,701 B1 | 5/2010 | Ehrmantraut et al. | |
| 7,775,483 B2 | 8/2010 | Olson | |
| 7,789,341 B2 | 9/2010 | Arlton et al. | |
| 7,900,866 B2 | 3/2011 | Kutzmann et al. | |
| 8,001,764 B2 | 8/2011 | Parks et al. | |
| 8,011,615 B2 | 9/2011 | Silansky et al. | |
| 8,028,952 B2 | 10/2011 | Urnes, Sr. | |
| 8,109,711 B2 | 2/2012 | Blumer et al. | |
| 8,231,083 B2 | 7/2012 | Kutzmann et al. | |
| 8,382,029 B2 | 2/2013 | Roy | |
| 8,421,257 B2 | 4/2013 | Chernyshov | |
| 8,602,349 B2 | 12/2013 | Petrov | |
| 8,646,719 B2 | 2/2014 | Morris et al. | |
| 8,708,285 B1 | 4/2014 | Carreiro | |
| 8,777,157 B2 | 7/2014 | Barrett et al. | |
| 8,825,225 B1 | 9/2014 | Stark et al. | |
| 8,876,571 B2 | 11/2014 | Trowbridge et al. | |
| 8,894,001 B2 | 11/2014 | Calverley | |
| 8,907,516 B2 | 12/2014 | Carroll | |
| 8,931,727 B2 | 1/2015 | Engblom | |
| 8,948,928 B2 | 2/2015 | Alber et al. | |
| 8,963,362 B2 | 2/2015 | Sia | |
| 8,982,333 B2 | 3/2015 | Guetta et al. | |
| 8,989,922 B2 | 3/2015 | Jones et al. | |
| 8,991,793 B1 | 3/2015 | Bemhardt | |
| 9,016,617 B2 | 4/2015 | Wang et al. | |
| 9,022,322 B2 | 5/2015 | Westbrook, Sr. | |
| 9,045,218 B2 | 6/2015 | Childress et al. | |
| 9,156,565 B2 * | 10/2015 | Hachtmann | B64F 1/12 |
| 9,290,269 B2 | 3/2016 | Walker et al. | |
| 9,302,770 B2 | 4/2016 | Burgess et al. | |
| 9,373,262 B2 | 6/2016 | Stigler et al. | |
| 9,753,355 B2 | 9/2017 | Waibel et al. | |
| 2004/0167682 A1 | 8/2004 | Beck et al. | |
| 2007/0244608 A1 | 10/2007 | Rath et al. | |
| 2010/0013236 A1 * | 1/2010 | Carroll | B64C 39/022 290/55 |
| 2011/0139928 A1 | 6/2011 | Morris et al. | |
| 2011/0180667 A1 | 7/2011 | O'Brien et al. | |
| 2011/0222047 A1 * | 9/2011 | Guetta | B64B 1/50 356/4.01 |
| 2012/0112008 A1 | 5/2012 | Holifield et al. | |

(56) References Cited

U.S. PATENT DOCUMENTS

| | | | |
|---|---|---|---|
| 2012/0298793 A1 | 11/2012 | Weddendorf et al. | |
| 2013/0233964 A1 | 9/2013 | Woodworth et al. | |
| 2013/0311009 A1 | 11/2013 | McAndrew et al. | |
| 2014/0284531 A1 | 9/2014 | Hoyt et al. | |
| 2014/0304107 A1 | 10/2014 | McAllister | |
| 2015/0184638 A1* | 7/2015 | Vander Lind | B21C 23/00 |
| | | | 242/601 |
| 2016/0137311 A1 | 5/2016 | Peverill et al. | |

FOREIGN PATENT DOCUMENTS

| | | |
|---|---|---|
| CN | 103144779 A | 6/2013 |
| CN | 203047531 U | 7/2013 |
| CN | 203127141 U | 8/2013 |
| DE | 19808777 A1 | 9/1999 |
| EP | 1901153 A1 | 3/2008 |
| EP | 2228301 | 9/2010 |
| FR | 2712563 | 5/1995 |
| FR | 2941921 | 8/2010 |
| WO | 95/24004 A1 | 9/1995 |
| WO | 2002/061971 A1 | 8/2002 |
| WO | 2007/141795 A1 | 12/2007 |
| WO | 2012/007942 A2 | 1/2012 |
| WO | 2012/094430 A2 | 7/2012 |
| WO | 2013/052178 A2 | 4/2013 |
| WO | 2013/162128 A1 | 10/2013 |

OTHER PUBLICATIONS

Bouabdallah et al., Towards Intelligent Miniature Flying Robots. Advanced Robotics. 2006;25:429-440.

Brooke, High Altitude LTA Platforms: Capabilities and Possibilities. AIAA 5th Aviation, Technology, Integration, and Operations Conference. pp. 1-7, Sep. 26-28, 2005.

Brynestad, Investigation of the flight control requirements of a half-scale ducted fan Unmanned Aerial Vehicle. Thesis, Calhoun: The NPS Institutional Archive DSpace Repository. 84 pages, Mar. 1992.

Byrne et al., Stereo Based Obstacle Detection for an Unmanned Air Vehicle. Proceedings of the 2006 IEEE International Conference on Robotics adn Automation. pp. 2830-2835, May 2006.

Clark, Canadair CL-227 remotely piloted vehicle. Proceedings of SPIE, 26 Annual Technical Symposium. pp. 112-120, (1982).

Culver, Military Applications of Fiber Optic Tethered Vehicle Technology. Proceedings of SPIE, O-E/Fiber Lase '88. Fiber Optic Systems for Mobile Platforms II. 1988;989:156-161.

Demars et al., C3ISR Digital Network Backbone Architecture. Proceedings of SPIE, AeroSense '99, pp. 99-115, (1999).

Dickard, Mini-RPV Recovery System Conceptual Study. USAAMRDL-TR-77-24, Teledyne Ryan Aeronautical. Eustis Directorate. 322 pages, Aug. 1977.

Epley, Stratospheric Aircraft, Blimps, Balloons, and Long Endurance Vehicles. AIAA, American Institute of Aeronautics and Astronautics. Future Aeronautical and Space Systems, Progress in Astronautics and Aeronautics. Chapter 5, pp. 211-250, (1996).

Fletcher, Autonomous Vehicles and the Net-centric Battlespace. International Unmanned Vehicle Symposium. 6 pages, Apr. 24-28, 2000.

Fowers et al., Vision Aided Stabilization and the Development of a Quad-Rotor Micro UAV. Proceedings of the 2007 IEEE International Symposium on Computational Intelligence in Robotics and Automation. pp. 143-148, Jun. 20-23, 2007.

Goebel, Unmanned Aerial Vehicles. Retrieved online at: https://web.archive.org/web/20120111195444/http://www.vectorsite.net/twuav/html. 3 pages. Mar. 1, 2010.

Goller, Tethered Rotorplatforms and Their Mission Potential. Seventh European Rotorcraft and Powered Lift Aircraft Forum. Sep. 8-11, 1981, 13 pages.

Han et al., Smart Deployment/Movement of Unmanned Air Vehicle to Improve Connectivity in MANET. IEEE Communications Society, WCNC 2006 Proceedings. pp. 252-257, (2006).

Hanford et al., A Small-Semi-Autonomous Rotary-Wing Unmanned Air Vehicle (UAV). Infotech@Aerospace. pp. 1-10, Sep. 26-29, 2005.

Hoffmann et al., Quadrotor Helicopter Flight Dynamics and Control: Theory and Experiment. American Institute of Aeronautics and Astronautics. Retrieved online at: https://pdfs.semanticscholar.org/f6a9/522225a98956d390f3d342244868867c472c.pdf. 20 pages, Aug. 23, 2007.

Howard et al., Survey of Unmanned Air Vehicles. Proceedings of the American Control Conference. pp. 2950-2953, Jun. 1995.

Johnson et al., Modeling, Control, and Flight Testing of a Small Ducted-Fan Aircraft. Journal of Guidance, Control, and Dynamics. Jul.-Aug. 2006;29(4):769-779.

Jourdan, Trajectory Design and Vehicle Guidance for a Mid-Air Rendezvous between Two Autonomous Aircraft. Submitted to the Department of Aeronautics and Astronautics in partil fulfillment of the requirements for the degree of Master of Science in Aeronautics and Astronautics at the Massachusetts Institute of Technology. 126 pages, Jun. 2003.

Kannamuller et al., Tethered RPV-Rotorcraft. Rotorcraft Design, 9 pages, Jan. 1978.

Kepler, Parent Child Unmanned Aerial Vehicles and the Structural Dynamics of an Outboard Horizontal Stabilizer Aircraft. Submitted to the Department of Aeronautics and Astronautics in partial fulfillment of the requirements for the degree of Master of Science in Aeronautics and Astronautics at the Massachusetts Institute of Technology. 136 pages, Jun. 2002.

Kivrak, Design of Control Systems for a Quadrotor Flight Vehicle Equipped with Inertial Sensors. A Thesis Submitted to the Graduate School of Natural and Applied Sciences of Atilim University. In Partial Fulfillment of the Requirement for the Degree of Master of Science in the Department of Mechatronics Engineering. 104 pages, Dec. 2006.

Lupashin et al., Stabilization of a Flying Vehicle on a Taut Tether using Inertial Sensing. 2013 IEEE/RSJ International Conference on Intelligent Robots and Systems (IROS). pp. 2432-2438, Nov. 3-7, 2013.

Merz, Development and testing of the digital control system for the Archytas Unmanned Air Vehicle. Thesis. Naval Postgraduate School. 117 pages, Dec. 1992.

Monton, Hardware and Software Implementation of a Control Pod for Airborne Wind Energy. Thesis, Escola Tecnica Superior d'Enginyeria de Telecomunicacio de Barcelona. 117 pages. (2011-2012).

Muttin, Umbilical deployment modeling for tethered UAV detecting oil pollution from ship. Applied Ocean Research. 2011;33:332-343.

Nagler, Design and Development of the One Man Coaxial Rotor Helicopter. Annals of the New York Academy of Sciences. Mar. 1963;107(1):19-24.

Noji et al., Multibeam Adaptive Array for RPV Antijam Communication. International Telemetering Conference Proceedings. Retrieved online at: http://hdl.handle.net/10150/609360. 14 pages, (1975).

Oh et al., Approaches for a Tether-Guided Landing of an Autonomous Helicopter. IEEE Transactions on Robotics. Jun. 2006;22(3):536-544.

Oh et al., Autonomous Helicopter Landing on a Moving Platform Using a Tether. Proceedings of the 2005 IEEE International Conference on Robotics and Automation. pp. 3960-3965, Apr. 2005.

Omelchenko, Avionics Systems Design for Cooperative Unmanned Air and Ground Vehicles. Submitted to the Department of Aeronautics and Astronautics in partial fulfillment of the requirements for the degrees of Master of Science in Aeronautics and Astronautics and Engineer in Aeronautics and Astronautics at the Massachusetts Institute of Technology. 95 pages, Jun. 2004.

Park, Avionics and Control System Development for Mid-Air Rendezvous of Two Unmanned Aerial Vehicles. Submitted to the Department of Aeronautics and Astronautics in partial fulfillment of the requirements for the degree of Doctor of Philosophy in Aeronautics and Astronautics at the Massachusetts Institute of Technology. 181 pages, Feb. 2004.

Park, Integration of Parent-Child Unmanned Air Vehicle Focusing on Control System Development. Submitted to the Department of Aeronautics and Astronautics in partial fulfillment of the require-

(56) References Cited

OTHER PUBLICATIONS ments for the degree of Master of Science in Aeronautics and Astronautics at the Massachusetts Institute of Technology. 115 pages, Feb. 2001.

Patel et al., A Testbed for Mini Quadrotor Unmanned Aerial Vehicle with Protective Shroud. 2nd Annual Symposium on Graduate Research and Scholarly Projects. pp. 26-27, (2006).

Pratt et al., Use of Tethered Small Unmanned Aerial System at Berkman Plaza II Collapse. Proceedings of the 2008 IEEE International Workshop on Safety, Security and Rescue Robotics. pp. 134-139, Oct. 2008.

Ruffier et al., Aerial robot piloted in steep relief by optic flow sensors. 2008 IEEE/RSJ International Conference on Intelligent Robots and Systems. pp. 1266-1273, Sep. 22-26, 2008.

Salih et al., Modelling and PID Controller Design for a Quadrotor Unmanned Air Vehicle. 2010 IEEE International Conference on Automation Quality and Testing Robotics (AQTR). 5 pages, May 28-30, 2010.

Schmidt et al., Automatic Hover Control of an Unmanned Tethered Rotorplatform. Automatica. 1974;10:393-403.

Snyder, Counter Narcotics Missions for Unmanned Aerial Vehicles. A Research Report Submitted to the Facility in Partial Fulfillment of the Graduation Requirements. Maxwell Air Force Base, Alabama. 33 pages, Apr. 2000.

Sousa et al., Distributed sensor and vehicle networked systems for environmental applications. Biologi Italiani. Sep. 2003;33(8):57-60.

Stentz et al., Integrated Air/Ground Vehicle System for Semi-Autonomous Off-Road Navigation. AUVSI Symposium. 15 pages, Jul. 9-11, 2002.

Stone et al., Flight Testing of the T-Wing Tail-Sitter Unmanned Air Vehicle. Journal of Aircraft. Mar.-Apr. 2008;45 (2):673-685.

Stone et al., Optimization of Transition Manoeuvres for a Tall-Sitter Unmanned Air Vehicle (UAV). Australian Aerospace International Congress. Retrieved online at: http://www.aeromech.usyd.edu.au/uav/twing/pdfs/AIAC_paper_final.pdf. 14 pages, (2001).

Stone, Control Architecture for a Tail-Sitter Unmanned Air Vehicle. 5th Asian Control Conference. pp. 736-744, (2004).

Stone, The T-wing tail-sitter unmanned air vehicle: from design concept to research flight vehicle. Proc Instn Mech Engrs. 2004;218(Part G):417-433.

Totsuka et al., Quad-rotor Flying along the Pipe. Proceedings of teh 2012 JSME Conference on Robotics and Mechatronics. pp. 2A2-L09(1)-2A2-L09(4), May 27-29, 2012.

Walker et al., Effects of Tether on Rotor UAS Flight. Retrieved online at: www.araa.asn.au/fsr/fsr2013/papers/pap159s2.pdf. 13 pages, (2013).

Yamada et al., Research of flying robot of bridge inspection. Implementation of control to avoid contact with structure. Proceedings of the 2014 JSME Conference on Robotics and Mechatronics. Pages 2A1-B02(1)-2A1-B02(4), May 25-29, 2014.

Yokota, et al., Children Watching System Using a Small UAV. Position Estimation and Following Control of a Target Jerson. Proceedings of the 2013 JSME Conference on Robotics and Mechatronics. Pages 1A1-F04(1)-1A1-F04(4), May 22-25, 2013.

Zheng et al., Real-time Route Planning for Unmanned Air Vehicle with an Evolutionary Algorithm. International Journal of Pattern Recognition and Artificial Intelligence. 2003;17(1):63-81.

Meyer, et al., Comprehensive Simulation of Quadrotor UAVs Using ROS and Gazebo, Department of Mechanical Engineerng, TU Darmstadt, Germany, 2012, LNAI 7628, pp. 400-411.

Muttin, Frederic, Modelling of a Captive Unmanned Aerial System Teledetecing Oil Pollution on Sea Surface, 2012, haI-00788980.

* cited by examiner

SPOOLER FOR UNMANNED AERIAL VEHICLE SYSTEM

CROSS REFERENCE TO RELATED APPLICATIONS

This application is a continuation of U.S. application Ser. No. 13/838,399, filed on Mar. 15, 2013, the contents of which are hereby incorporated by reference in its entirety.

BACKGROUND

This invention relates to a spooler for use in an unmanned aerial vehicle system.

Unmanned aerial vehicles (UAVs) are vehicles that are controlled autonomously by onboard or remote computer, remotely by a human operator, or a mixture of the two. Use of such vehicles is becoming increasingly common in both military and civilian airspaces.

SUMMARY

In an aspect, in general, a spooling apparatus includes a filament feeding mechanism for deploying and retracting filament from the spooling apparatus to an aerial vehicle, an exit geometry sensor for sensing an exit geometry of the filament from the spooling apparatus, and a controller for controlling the feeding mechanism to feed and retract the filament based on the exit geometry.

Aspects may include one or more of the following features.

The spooling apparatus may include a spool of filament. The spooling apparatus my include a tension sensing and mitigation mechanism for sensing tension present on the filament and causing the controller to adjust an amount of deployed filament based on the sensed tension. The tension sensing and mitigation mechanism may be further configured to mitigate an amount of slack in the filament within the spooling apparatus. The exit geometry sensor may be configured to sense an angle of departure of the filament from the spooling apparatus. The exit geometry sensor may be configured to sense a location of the filament at an exit of the spooling apparatus.

The spooling apparatus may include a power source for providing power to the aerial vehicle over the filament. The spooling apparatus may include a control station configured to communicate with the aerial vehicle over the filament. The data communicated between the aerial vehicle and the control station may include one or more of network data, point to point serial data, sensor data, video data, still camera data, payload control data, vehicle control data, and vehicle status data.

The filament may be configured to act as a tether for limiting a range of the aerial vehicle. The exit geometry sensor may be configured to determine the angle of departure of the filament by measuring a value that characterizes the angle. The spool may include perforations and the spooling apparatus may include a cooling apparatus for cooling the first portion of filament by forcing cooled air through perforations in the spool and over the first portion of filament. The controller may be configured to maintain the exit geometry at an exit geometry setpoint. The controller may be configured to allow the exit geometry to deviate by a predefined amount from the setpoint without taking corrective action.

In another aspect, in general, a method for managing a filament coupling an aerial vehicle to a spooling apparatus includes sensing an exit geometry of the filament from the spooling apparatus and feeding filament from the spooling apparatus according to the exit geometry including controlling a length of filament deployed from the spooling apparatus based on the exit geometry.

Aspects may include one or more of the following features.

Sensing the exit geometry of the filament from the spooling apparatus may include sensing an angle of departure of the filament from the spooling apparatus to the aerial vehicle. Sensing the exit geometry of the filament from the spooling apparatus may include sensing a location of the filament at an exit of the spooling apparatus. The method may further include providing power to the aerial vehicle via the filament. The method may further include establishing a communication channel between the aerial vehicle and a control station via the filament. The method may further include transmitting data over the communication channel including transmitting one or more of network data, point to point serial data, sensor data, video data, still camera data, payload control data, vehicle control data, and vehicle status data.

The method may further include tethering the aerial vehicle to limit a range of the aerial vehicle. The method may further include sensing an angle of departure of the filament including sensing a value that characterizes the angle. The method may further include cooling the first portion of filament, the cooling including forcing cooled air through perforations in the spool and over the first portion of filament. Controlling a length of a portion the filament wound on a spool of the spooling apparatus based on the exit geometry may include maintaining the exit geometry of the filament at an exit geometry setpoint. Maintaining the exit geometry at the exit geometry setpoint may include allowing the exit geometry of the filament to deviate by a predefined amount from the setpoint without taking corrective action.

In another aspect, in general, an unmanned aerial vehicle system includes an aerial vehicle and a spooling apparatus. The spooling apparatus is configured to sense an exit geometry of a filament from the spooling apparatus and feed filament from the spooling apparatus according to the exit geometry including controlling a length filament deployed from the spooling apparatus based on the exit geometry.

Aspects may include one or more of the following features.

The aerial vehicle may be collapsible. The system may be configured to be mounted to a mobile vehicle. The system may be configured to be collapsed and stowed in a human portable container. The system may be configured to be collapsed and stowed in a ruggedized container.

Other features and advantages of the invention are apparent from the following description, and from the claims.

DESCRIPTION

1 System Overview

Figure 1:
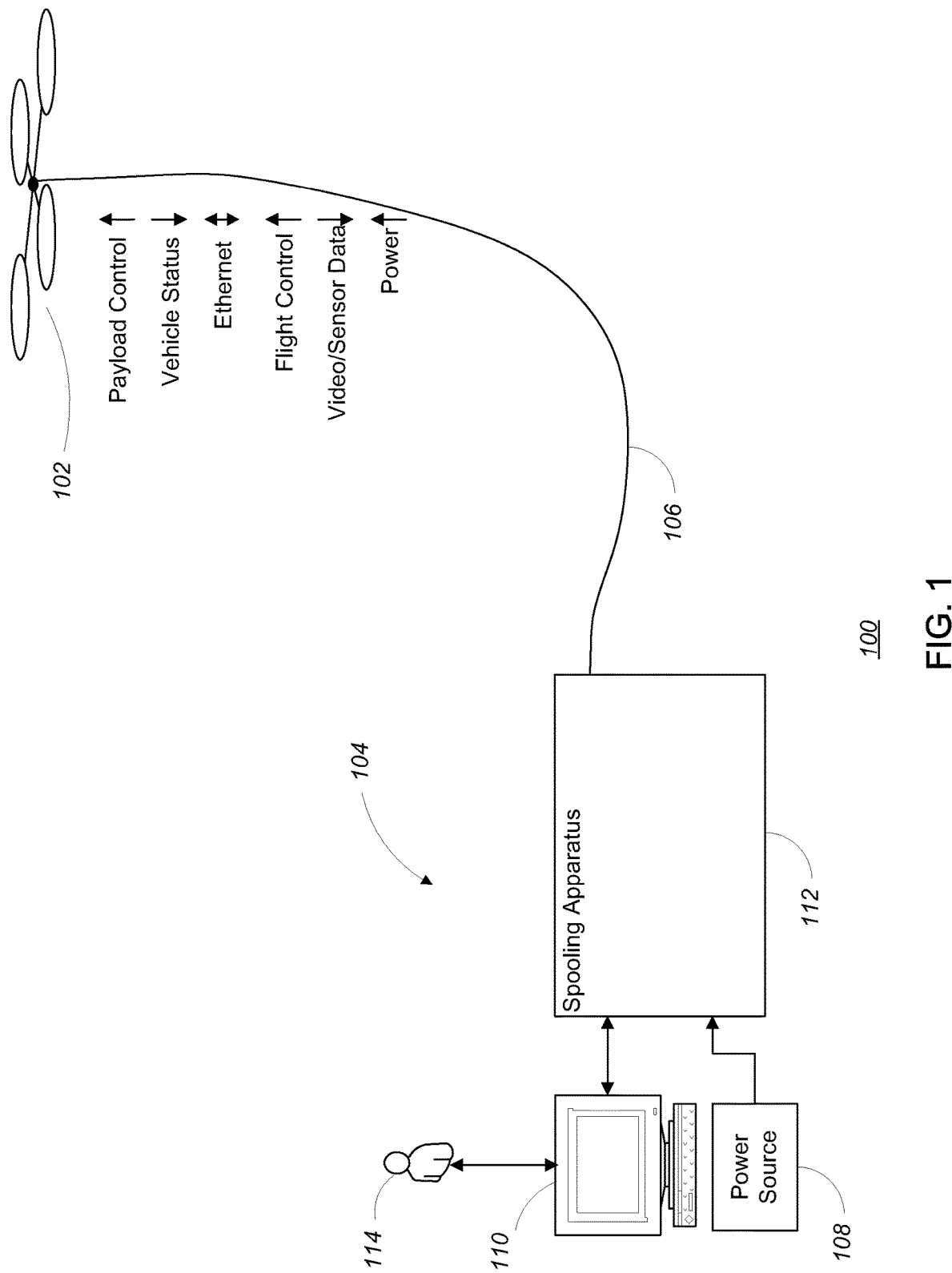
FIG. 1 is a ground powered unmanned aerial vehicle system.

Referring to FIG. 1, in one embodiment, a ground powered unmanned aerial vehicle system 100 includes an unmanned aerial vehicle 102 which is powered by and in communication with a base station 104 over an electrically conductive filament 106.

The base station 104 includes a power source 108 (e.g., a generator, battery, or power grid), a control station 110 (e.g., a laptop computer), and a spooling apparatus 112. The power source 108 provides power to the aerial vehicle 102 over the filament 106. The control station 110 communicates with the aerial vehicle 102 by, for example, establishing a network connection (e.g., an Ethernet connection) between itself and the aerial vehicle 102 over the filament 106. In various embodiments, different types of information can be communicated between the control station 110 and the aerial vehicle 102. For example, the control station 110 can send control information such as flight control information (e.g., GPS coordinates, flight speed, etc.), payload control information, and sensor (e.g., camera) control information to the aerial vehicle 102. The aerial vehicle 102 can send information such as vehicle status information (e.g., current GPS coordinates, current payload status, etc.) and sensor data (e.g., video streams acquired by on-vehicle cameras) back to the control station 110. In some examples, the filament 106 is the same or similar to the filaments described in U.S. Pat. No. 7,510,142 titled "AERIAL ROBOT," U.S. Pat. No. 7,631,834 titled "AERIAL ROBOT WITH DISPENSABLE CONDUCTIVE FILAMENT," and U.S. Patent Publication 2007/0200027 A1 titled "AERIAL ROBOT" which are incorporated herein by reference. Note that in the above patents and patent applications described above generally include a spool of filament in the aerial vehicle. However, as is described in greater detail below, the filament can similarly be spooled in the base station 104 on the ground.

In some embodiments in which the vehicle 102 provides sensor data, a user 114 can interact with the control station 110 to view sensor data and flight status information from the aerial vehicle 102 and/or to specify commands for controlling the aerial vehicle 102.

One common application for the ground powered unmanned aerial vehicle system 100 is to survey (e.g., video monitoring) a geographical area. For example, the user 114 of the system 100 may use the control station 110 to issue a command to the aerial vehicle 102, causing the aerial vehicle 102 to hover at a given GPS coordinate (i.e., a latitude, longitude, and altitude). The user 114 may monitor sensor data (e.g., a 720p video stream) from the aerial vehicle 102 to, for example, ensure that no unauthorized parties are approaching the user's position.

The aerial vehicle 102 includes control systems that continuously attempt to maintain the vehicle 102 at the commanded GPS coordinate (note that in some embodiments, the control system may be located in the base station 104. However, due to environmental conditions such as wind, the aerial vehicle 102 is rarely able to maintain its position exactly at the commanded GPS coordinate. Furthermore, at times, wind can cause the aerial vehicle 102 to significantly deviate from the commanded GPS coordinate. Without mitigation, such a deviation can cause the amount of slack on the filament 106 to vary, possibly damaging the very thin, lightweight, and fragile filament 106. For example, wind may blow the vehicle 102 in a direction away from the base station 104, causing the amount of slack on the filament 106 to decrease, potentially placing excess tension on the filament 106 or at the very least placing a lateral force on the aerial vehicle 102 which the aerial vehicle 102 must compensate for. Without mitigation, such excess tension may result in the filament 106 breaking. Conversely, wind may blow the vehicle 102 in a direction toward the base station 104, causing the amount of slack on the filament 106 to increase. Without mitigation, the filament 106 with excess slack can potentially fall toward the ground and become tangled with ground based objects.

The term 'slack' as is used above refers to a degree of tautness in the filament 106. For example, if the filament 106 were to be held perfectly taut between the spooling apparatus 112 and the aerial vehicle 102, then there would be no slack on the filament 106. As the tautness of the filament 106 between the aerial vehicle 102 and the spooling apparatus 112 decreases, the amount of slack on the filament 106 increases. In some examples, the amount of slack on the filament can be characterized in a length of an excess of deployed filament 106 or a length of a shortage of deployed filament 106.

2 Spooling Apparatus

Figure 2:
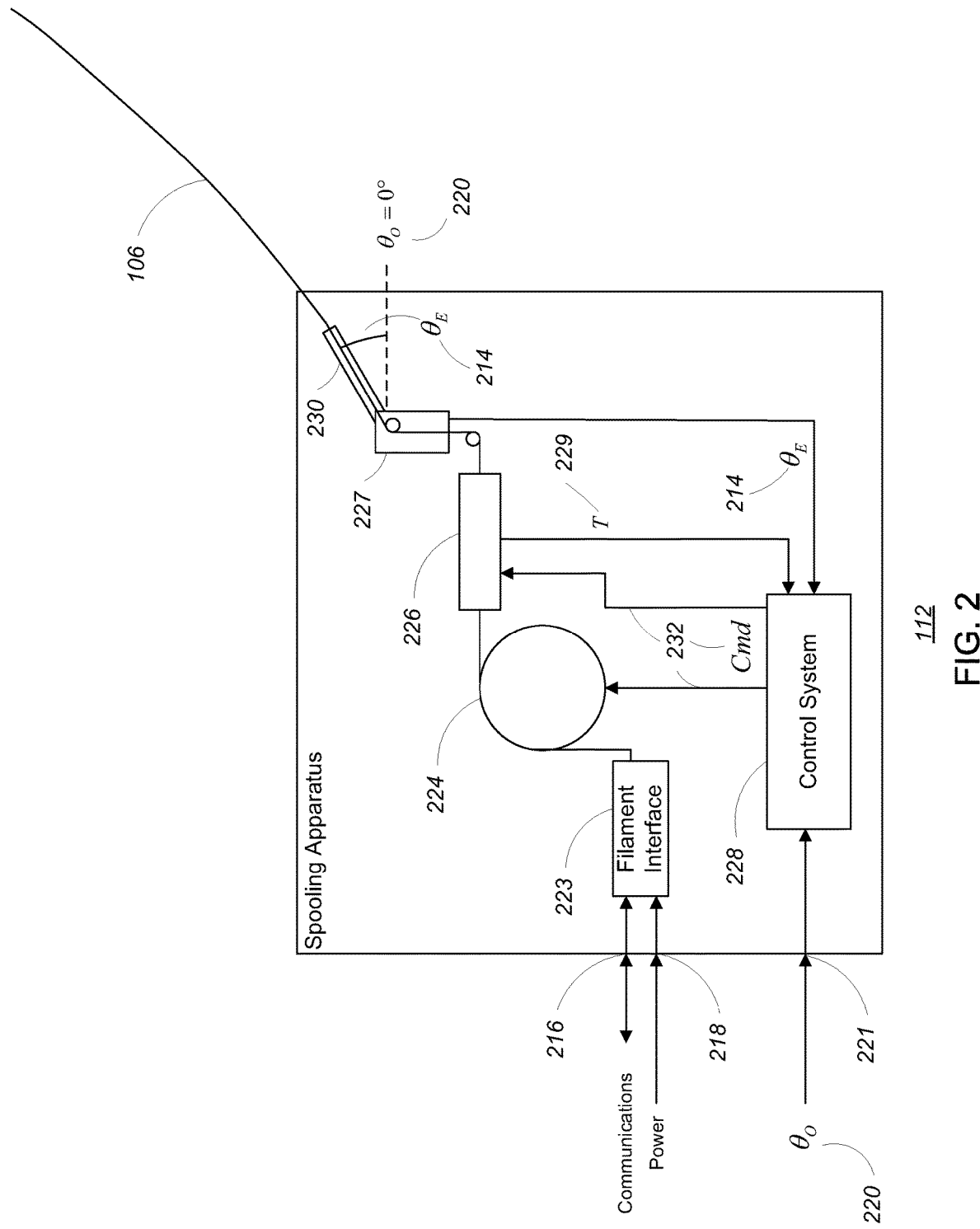
FIG. 2 is a spooling apparatus.

Referring to FIG. 2, the spooling apparatus 112 is configured to mitigate the risks described above by controlling the amount of filament 106 that is deployed such that the amount of slack on the filament 106 is optimized. In some examples, the desired amount of slack minimizes (or generally reduces or limits) the amount of horizontal force between the base station 104 and the aerial vehicle 102 while maintaining a safe distance between the ground the filament 106.

Optimizing of the amount of slack on the filament 106 reduces the risk of breaking the filament 106 due to excess tension on the filament 106 and reduces the risk of having the filament 106 become entangled with objects close to the ground due to excess slack on the paid out filament 106.

Before describing the specific functionality of the spooling apparatus 112, it is important to note that to optimize the amount of slack on the filament 106, the spooling apparatus 112 utilizes a relationship that exists between the amount of slack on the filament 106 and an exit angle, $\theta_E$ 214 of the filament 106 from the spooling apparatus 112. In particular, it is known that as the distance between the aerial vehicle 102 and the spooling apparatus 112 increases, the filament 106 is pulled taut, causing the filament 106 to become less slack. As the filament 106 becomes less slack, the exit angle, $\theta_E$ 214 of the filament 106 from the spooling apparatus 112 increases. Conversely, as the distance between the spooling apparatus 112 and the aerial vehicle 102 decreases, the filament 106 becomes less taut, causing the amount of slack on the filament 106 to increase. As the amount of slack on the filament 106 increases, the exit angle, $\theta_E$ 214 of the filament 106 from the spooling apparatus 112 decreases.

Thus, the spooling apparatus 112 is configured to control the amount of filament 106 that is deployed according to a desired exit angle or set-point, $\theta_o$ 220 of the filament 106 from the spooling apparatus 112, for example to maintain the set-point, $\theta_o$ 220. Furthermore, the spooling apparatus 112 also prevents tension in the filament 106 from exceeding a predefined maximum tension.

In general, the set-point, $\theta_o$ 220 is defined by the user 114 on a case-by-case basis. In many situations the best choice for the set-point is simply 0° (i.e., extending along a line that is parallel to the ground). However, in some examples, an obstacle near the base station 104 may necessitate that the set-point, $\theta_o$ 220 is a positive angle (relative to a line extending parallel to the ground) to ensure that the filament 106 does not become entangled with the obstacle. In other examples, the terrain may allow for a set-point, $\theta_o$ 220 that is negative (relative to a line extending parallel to the ground). For example, the base station 104 may be on the top of a mountain and a filament 106 with significant slack will not likely encounter any obstacles due to the sloping sides of the mountain.

The spooling apparatus 112 of FIG. 2 includes a communications input port 216, a power input port 218, and a set-point input port 221. The spooling apparatus 112 also includes a filament interface 223, a spool 224, a feeder/tension sensor 226, a position sensor 227, and a control system 228.

The filament interface 223 receives the communications and power inputs and couples them to the filament 106. The filament 106 extends from the filament interface 223 to the spool 224. In general, the spool 224 is a cylindrical member onto which the filament 106 that is not deployed from the spooling apparatus 112 is wound. In some examples, the spool 224 is driven by a motor which can be controlled (e.g., by the control system as is described below) to cause the spool 224 to rotate in a first direction to deploy filament 106 and in a second direction to re-spool filament 106. The motor is also controllable to vary the speed of rotation of the spool 224.

After being deployed from the spool 224, the filament 106 is fed into a feeder/tension sensor 226. In general, the feeder/tension sensor 226 serves two functions:
  quickly feeding the filament 106 from the spooler 224 through the spooling apparatus 112, and
  measuring the tension, T 229 that is present on the filament 106.

A signal representing the tension, T 229 measured by the feeder/tension sensor 226 is passed to the control system 228. The filament 106 is fed through the feeder/tension sensor 226 to the position sensor 227. A more detailed description of the feeder/tension sensor 226 is presented below.

The position sensor 227 measures an exit geometry (e.g., a position) of the filament 106 at the point where the filament 106 exits the spooling apparatus 112. The measured position of the filament 106 is then used to determine the exit angle, $\theta_E$ 214 of the filament 106. The exit angle, $\theta_E$ 214 is passed from the position sensor 227 to the control system 228.

In some examples, the position sensor 227 includes a straw-like tube 230 which coaxially surrounds a portion of the filament 106 at the point where the filament 106 exits the spooling apparatus 112. The straw like tube 230 is coupled to, for example, a high precision potentiometer, which outputs a signal indicative of the exit angle, $\theta_E$ 214 of the filament 106. In other examples, various types of position sensors such as optical, mechanical, or magnetic rotary encoders are used to sense $\theta_E$ 214 of the straw. In other examples, different types of sensors such as inductive position sensors can be used to sense $\theta_E$ 214.

In some examples, the control system receives the exit angle, $\theta_E$ 214, the set-point, $\theta_o$ 220, and the measured tension, T 229 as inputs and applies a control algorithm to the inputs to determine a control signal output, Cmd 232. The control signal output, Cmd 232 is passed to the spool 224 and/or to the feeder/tension sensor 226 and actuates the spool 224 and/or the feeder/tension sensor 226 to maintain the exit angle, $\theta_E$ 214 of the filament 106 at the set-point, $\theta_o$ 220. In some examples, a filament feeding mechanism (e.g. pinch rollers) in the feeder/tension sensor 226 receives the Cmd 232 input and which causes the filament feeding mechanism to vary a speed and direction of filament feeding based on the exit angle, $\theta_E$ 214. For example, if the sensed exit angle, $\theta_E$ 214 is below the setpoint, $\theta_o$ 220 the filament feeding mechanism receives a value of Cmd 232 which causes the filament feeding mechanism to re-spool filament at a commanded speed. Conversely, if the sensed exit angle, $\theta_E$ 214 is above the setpoint, $\theta_o$ 220 the filament feeding mechanism receives a value of Cmd 232 which causes the filament feeding mechanism to deploy filament at a commanded speed.

In some examples, speed and direction of operation of the filament feeding mechanism (which is based on the sensed exit angle $\theta_E$ 214) indirectly controls the speed and direction of rotation of the spool 224. For example, a dancer mechanism within the feeder/tension sensor 226 may sense a decrease in slack or tension in the filament within the feeder/tension sensor 226 and subsequently command the spool 224 to alter its speed and direction of rotation. In other examples, the Cmd 232 signal from the control system 228 directly controls both the filament feeding mechanism and the spool 224. In this way, the control system 228 causes the spool 224 and feeder/tension sensor 226 to deploy or re-spool filament 106 such that the set-point, $\theta_o$ 220 is maintained.

In the examples described above, the filament feeding mechanism is described as being included in the feeder/tension sensor 226 (e.g., as pinch rollers). In other examples, the filament feeding mechanism is included at the exit of the spooling apparatus, for example, in the position sensor 227.

In some examples, the control system is a cascaded control system with an inner loop which controls a torque output of the spool motor and one or more output loops that implement position, velocity, tension, and angle based control.

A variety of suitable feedback control system algorithms can be implemented by the control system 228. Some examples of suitable feedback control systems are proportional controllers, PID controllers, state space controllers, etc.

In some examples, the control system 228 is also configured to monitor the measure of tension, T 229 to determine if a dangerous amount of tension is present on the filament 106. If the control system 228 determines that the tension, T 229 on the filament 106 is greater than a predetermined limit, the control system 228 causes the spool 224 to deploy filament 106 until the tension on the filament 106 is reduced to a safe level (e.g., the tension on the filament is below the predetermined limit).

3 Example

Figure 3:
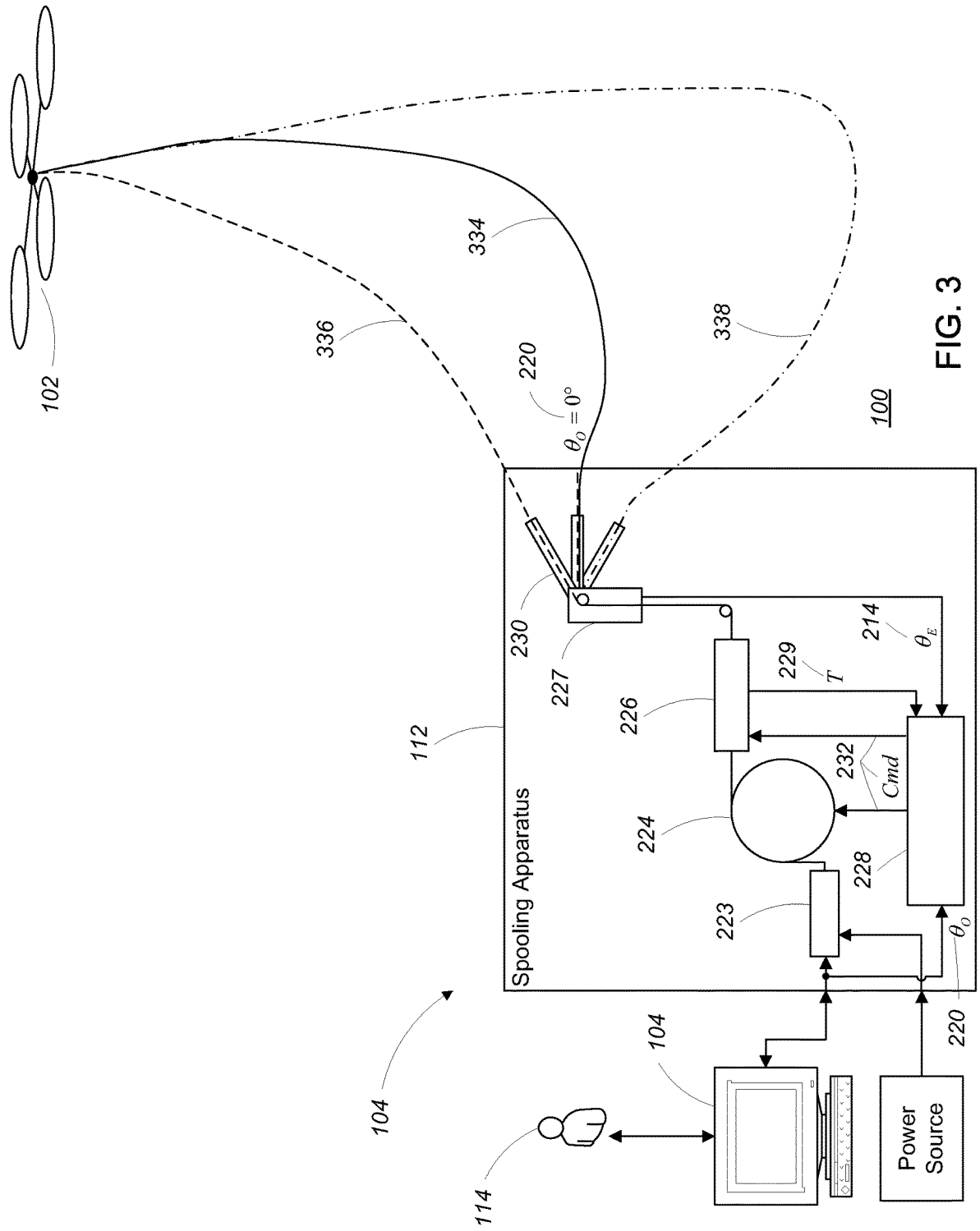
FIG. 3 illustrates a number of operational scenarios of the ground powered or non-ground powered tethered unmanned aerial vehicle system.

Referring to FIG. 3, the ground powered unmanned aerial vehicle system 100 is shown with the filament 106 in three different scenarios. In the first scenario, a sufficiently deployed filament 334 has a sufficient amount of filament deployed, causing the actual exit angle, $\theta_E$ 214 measured by the position sensor 227 to be substantially the same as the desired exit angle, $\theta_o$ 220 (in this example, 0°). In this case, the spooling apparatus 112 does not need to take any action to correct the exit angle, $\theta_E$ 214 of the filament.

In the second scenario, an overly taut filament 336 has too little filament deployed, causing the actual exit angle, $\theta_E$ 214 measured by the position sensor 227 to be greater than the desired exit angle, $\theta_o$ 220. As is noted above, such a scenario may occur if the aerial vehicle 102 is blown in a direction away from the base station 104. In this case, the spooling apparatus 112 acts to deploy additional filament in order to provide slack to the deployed filament. In particular, the control system 228 determines that the actual exit angle, $\theta_E$ 214 is greater than the desired exit angle, $\theta_o$ 220 and sends a control signal, Cmd 232 to the spool 224, commanding the spool 224 to adjust the amount of deployed filament until the actual exit angle, $\theta_E$ 214 and the desired exit angle, $\theta_o$ 220 are substantially the same.

In the third scenario, an overly slack filament 338 has too much filament deployed, causing the actual exit angle, $\theta_E$ 214 measured by the position sensor 227 to be less than the desired exit angle, $\theta_o$ 220. As is noted above, such a scenario can occur if the aerial vehicle 102 is blown in a direction toward the base station 104. In this case, the spooling apparatus 112 acts to re-spool the deployed filament in order to reduce the amount of slack on the deployed filament. In particular, the control system 228 determines that the actual exit angle, $\theta_E$ 214 is less than the desired exit angle, $\theta_o$ 220 and sends a control signal, Cmd 232 to the spool 224, commanding the spool 224 to adjust the amount of deployed filament until the actual exit angle, $\theta_E$ 214 and the desired exit angle, $\theta_o$ 220 are substantially the same.

4 Additional Features 4.1 Sensor Dead Zone

Figure 4:
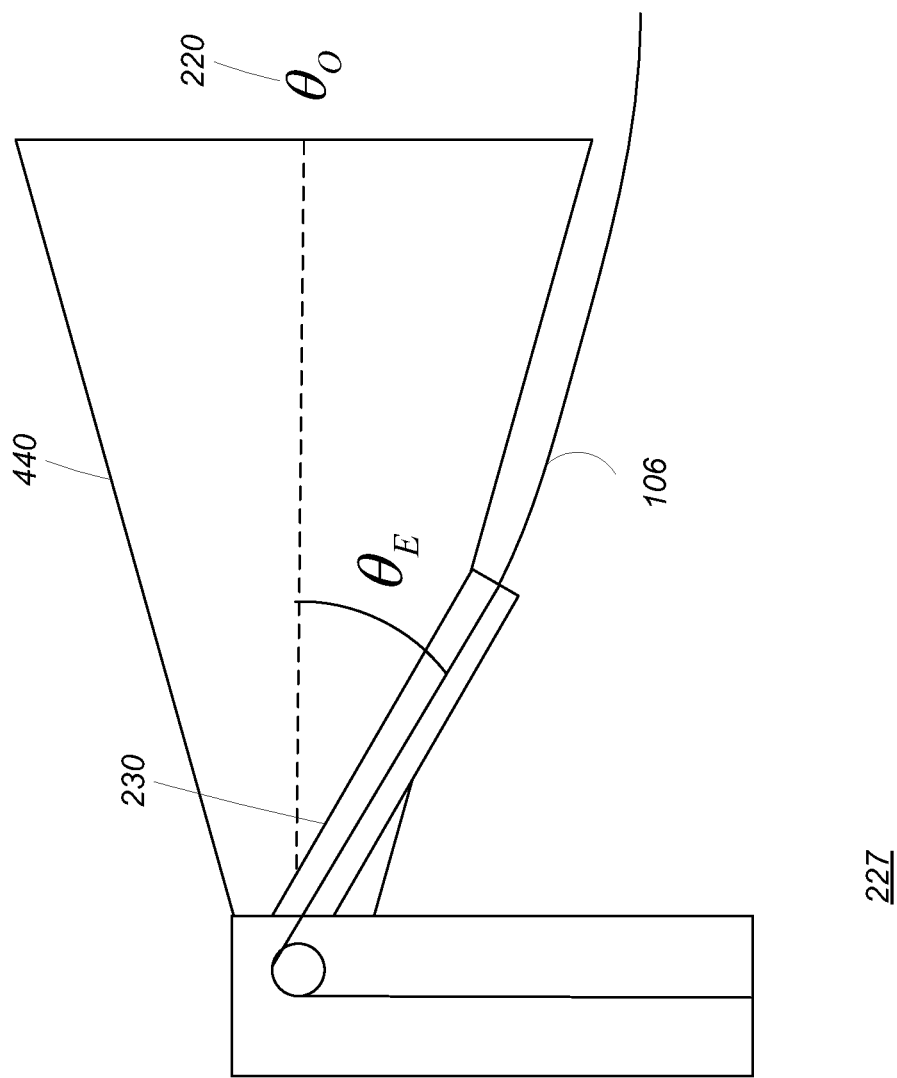
FIG. 4 illustrates an exit angle dead zone.

Referring to FIG. 4, in some examples, the control system 228 allows for a "dead zone" 440 around the desired exit angle, $\theta_o$ 220. In general, the dead zone 440 is a range of angles surrounding the desired exit angle, $\theta_o$ 220. If the exit angle, $\theta_E$ 214 measured by the position sensor 227 falls within the dead zone 440, the control system 228 takes no action to adjust the length of the filament 106. Once the exit angle, $\theta_E$ 214 measured by the position sensor 227 exceeds the boundaries of the dead zone 440, the control system 228 re-spools or deploys filament 106 as described above.

4.2 Cooling and Cross Ratio

Figure 5:
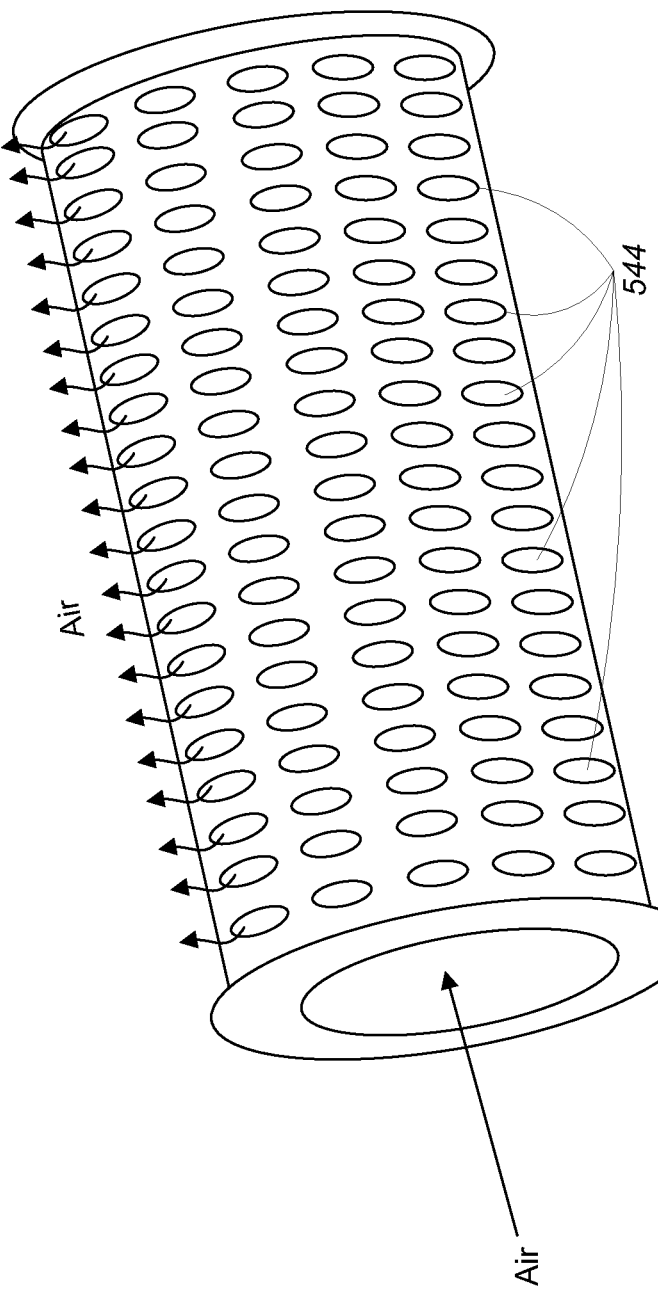
FIG. 5 is a perforated spool.

In some examples, the filament 106 is required to carry a substantial amount of power to the aerial vehicle 102 and resistive losses in the filament 106 cause heating of the filament 106. In general, the deployed filament 106 is cooled as it drifts through the air. However, the spooled (i.e., un-deployed) filament 106 can become overheated, possibly damaging the filament. Referring to FIG. 5, to address heating of the filament 106, the spool 224 is hollow and includes a plurality of perforations 544. Air is forced into the hollow spool 224, creating a positive pressure within the spool 224 which causes the air to flow out of the spool 224 through the perforations 544. The air flowing through the perforations 544 acts to cool the filament 106 which is wound on the spool 224. In some examples, the filament 106 is wound onto the spool 224 in a predetermined pattern such that the amount of surface area of the filament 106 that comes into contact with the air flowing through the perforations 544 is maximized while not inhibiting the airflow. In some examples, the predetermined winding pattern also minimizes cross-talk between individual windings of the filament 106.

In general, deploying or re-spooling of filament 106 on the spool 224 is at least in part accomplished by rotating the spool 224 while laterally moving a level winder (see the level winder of FIG. 6) back and forth from one end of the spool 224 to the other. A spooling pattern is defined by an amount of lateral movement of the level winder relative to the number of rotations of the spool and is referred to as the "cross ratio." Different cross ratios may be chosen for different applications. For example, certain cross ratios may be advantageous for applications where heating of the spooled microfilament is a problem. Such cross ratios may, for example, maximize airflow through the perforations 544. Other cross ratios may be advantageous for applications where cross-talk between individual windings is a problem.

The cross ratio for a given application must be taken into account when winding new spools of microfilament. Furthermore, the firmware of the spooling apparatus must also be configured to maintain the desired cross ratio as the microfilament is deployed and re-spooled from the spooling apparatus.

4.3 Feeder/Tension Sensor

Figure 6:
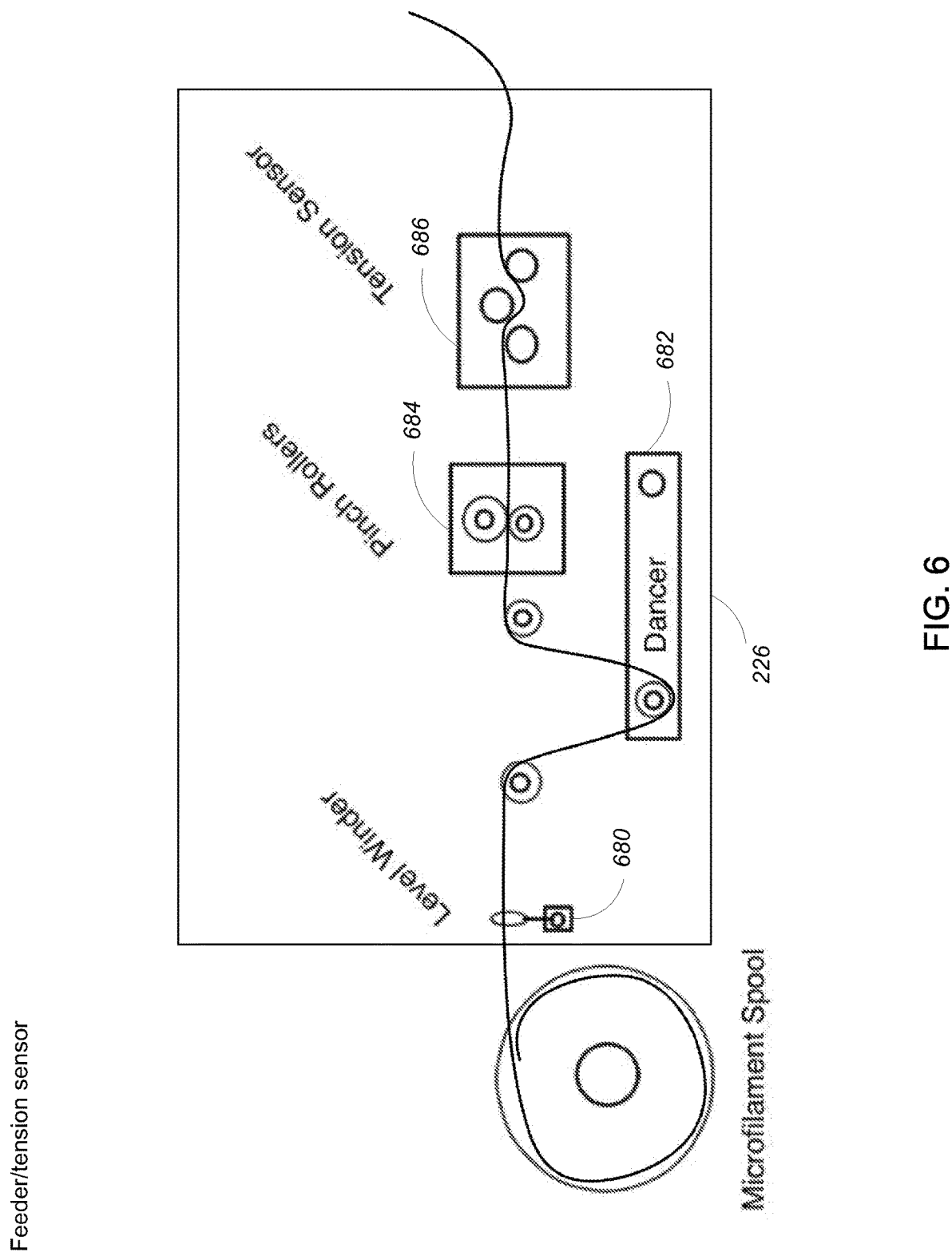
FIG. 6 is a feeder/tension sensor.

Referring to FIG. 6, one example of the feeder/tension sensor 226 is configured to safely and quickly deploy and re-spool microfilament from the spooling apparatus. The feeder/tension sensor 226 includes a level winder 680, a dancer mechanism 682, a pinch roller mechanism 684, and a tension sensor 686. The level winder 680 maintains a proper cross ratio of the spooled microfilament 106, the dancer mechanism 682 mitigates microfilament slack within the spooling apparatus, the pinch roller mechanism 684 maintains a desired microfilament tension within the spooling apparatus, and the tension sensor monitors the amount of tension on the microfilament.

4.4 Full or Partial Tethering

Figure 7:
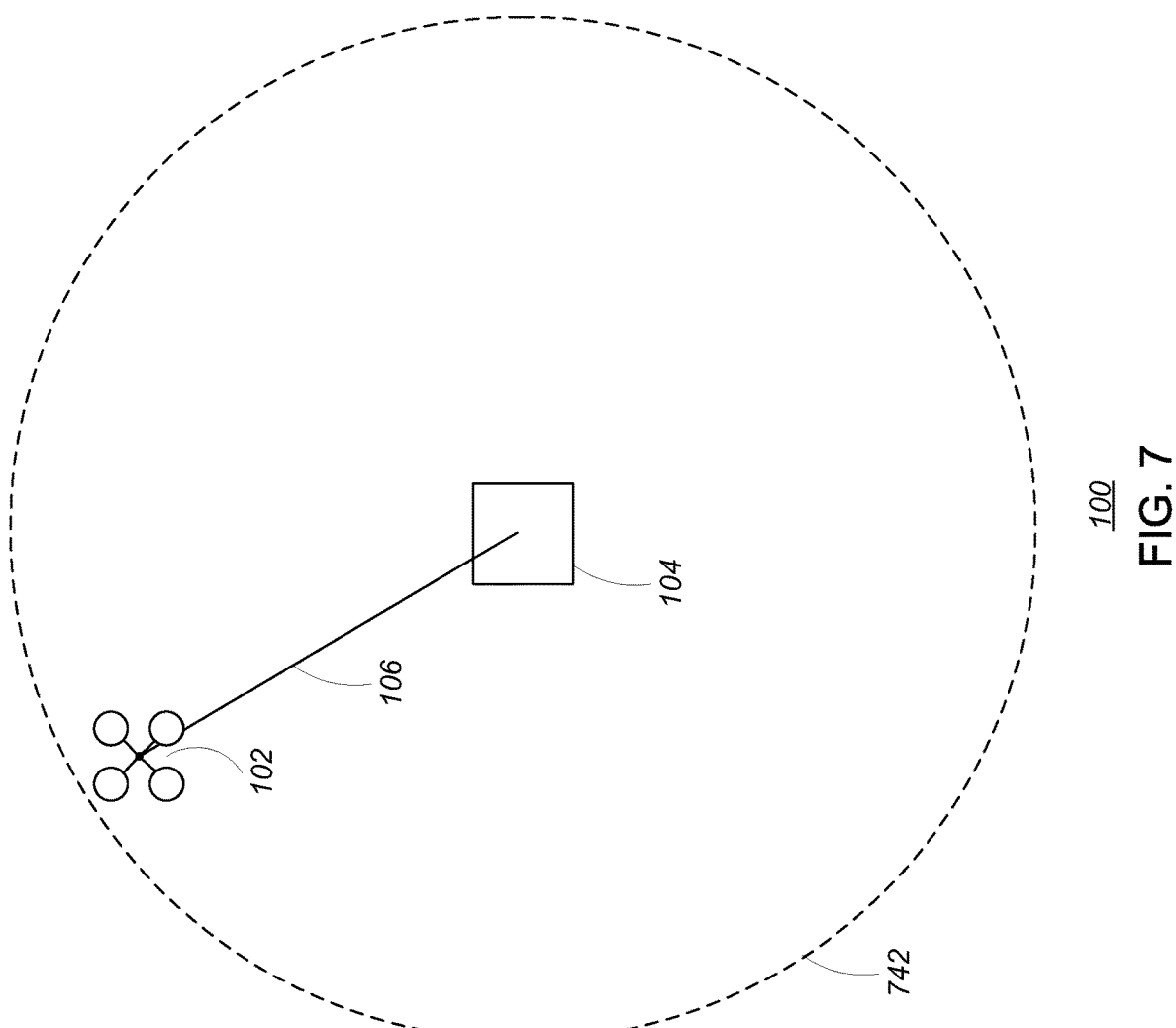
FIG. 7 is a tethering version of the ground powered or non-ground powered tethered unmanned aerial vehicle system.

Referring to FIG. 7, another example of the ground powered unmanned aerial vehicle system 100 is configured to constrain a range of motion of the aerial vehicle 102 within a boundary 742. In some examples, the boundary 742 is three dimensional. For example, the boundary 742 shown in FIG. 7 (which is circular when viewed from above) may have, for example, a three dimensional dome shape. In some examples, the boundary 742 can take on other shapes, including user-defined and possibly irregular shapes.

In some examples, the boundary 742 may be maintained by providing the spooling apparatus 112 of the base station 104 with a limited amount of filament 106 such that, as the aerial vehicle 102 approaches the boundary 742, the spooling apparatus 112 is unable to deploy any more filament 106. In other examples, the boundary 742 may be maintained by providing the spooling apparatus 112 with a specification of the boundary 742 and configuring the spooling apparatus 112 to refuse to deploy additional filament 106 when the aerial vehicle 102 is at the edge of the boundary 742.

In some examples, the filament 106 is stronger than the communications and power transmission filament described above in order to resist breaking when tension is applied to the filament 106 at the edge of the boundary 742.

In some examples, the aerial vehicle 102 is self powered (e.g., a battery powered aerial vehicle) and the filament is used only as a tether to constrain the aerial vehicle 102.

5 Deployment Configurations

Figure 8:
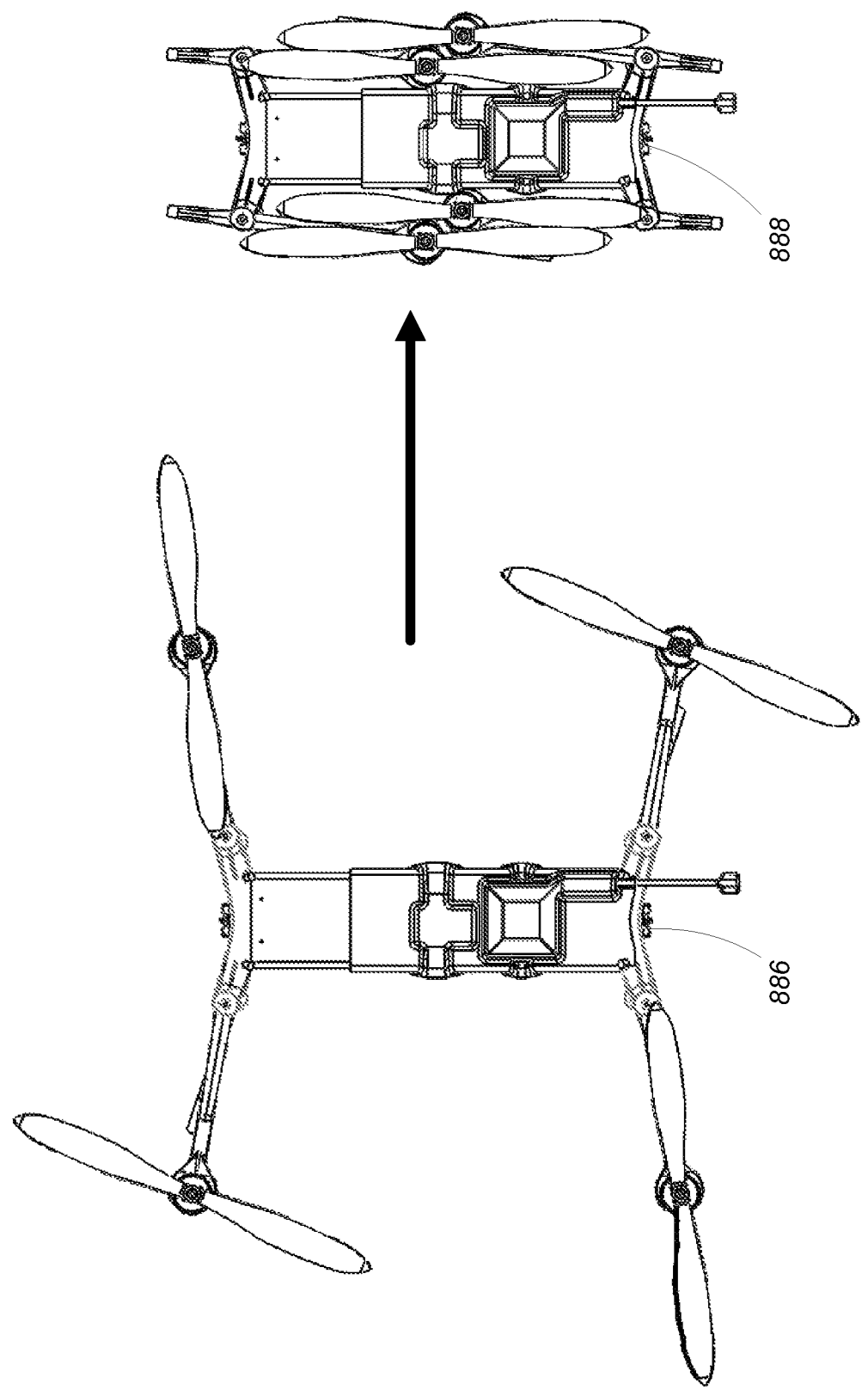
FIG. 8 is a collapsible aerial vehicle.

Referring to FIG. 8, in some examples, the airframe of the aerial vehicle is collapsible such that the vehicle can be easily and safely stowed in a compact container. For example, the airframe of the aerial vehicle can operate in an expanded state 886 and collapse to a collapsed state 888 when no longer operating. In this way, the aerial vehicle can easily be stowed and transported without being unduly cumbersome and with reduced risk of being damaged.

Figure 9:
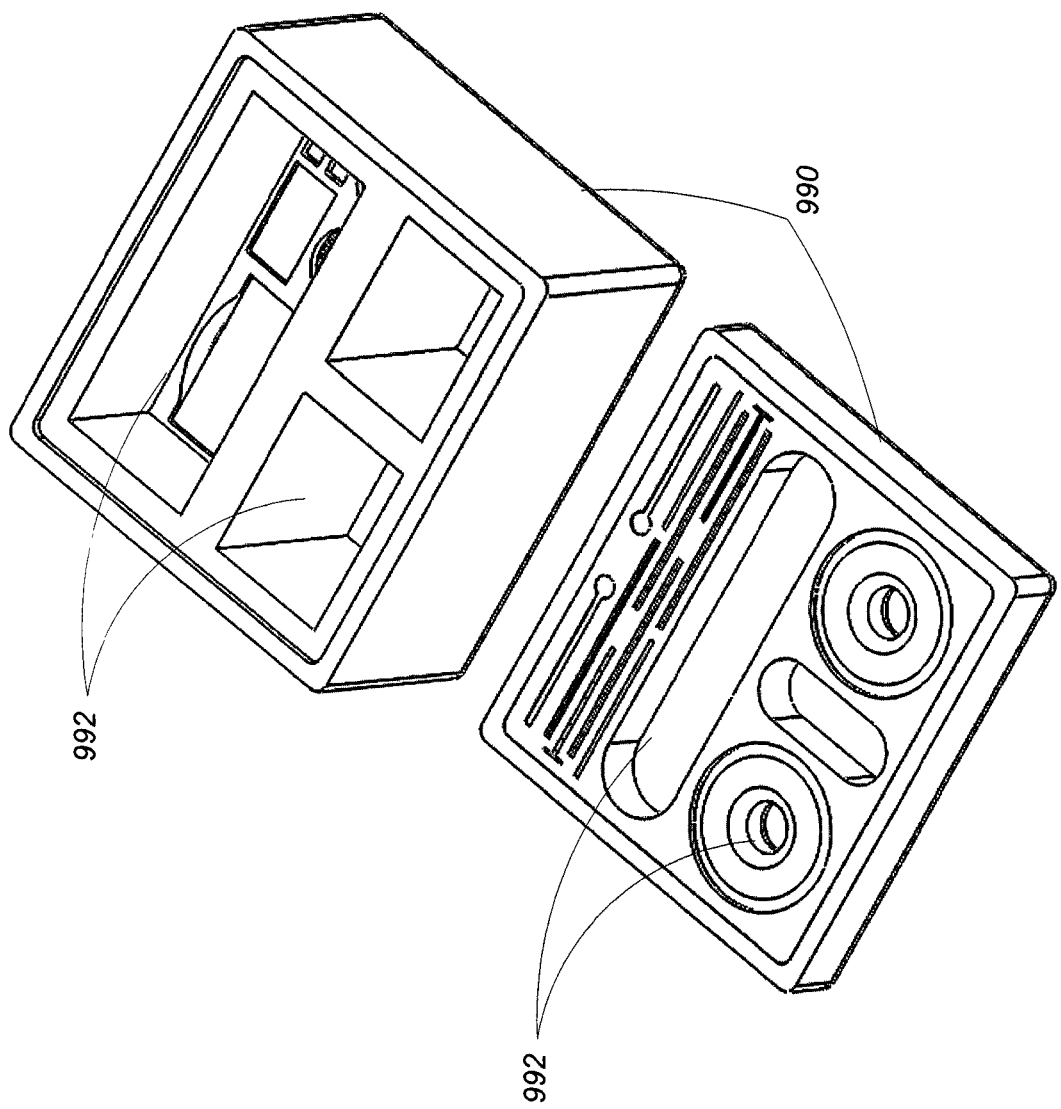
FIG. 9 is a ruggedized container for transporting the ground powered unmanned aerial vehicle system.

Referring to FIG. 9, in some examples, the elements described above can be packaged into a ruggedized container 990 for safe deployment. The ruggedized container can include a number of compartments 992 for safely and securely storing different components of the aerial vehicle system such as the aerial vehicle (or parts thereof), the spooler apparatus, additional spools of microfilament, and so on.

Figure 10:
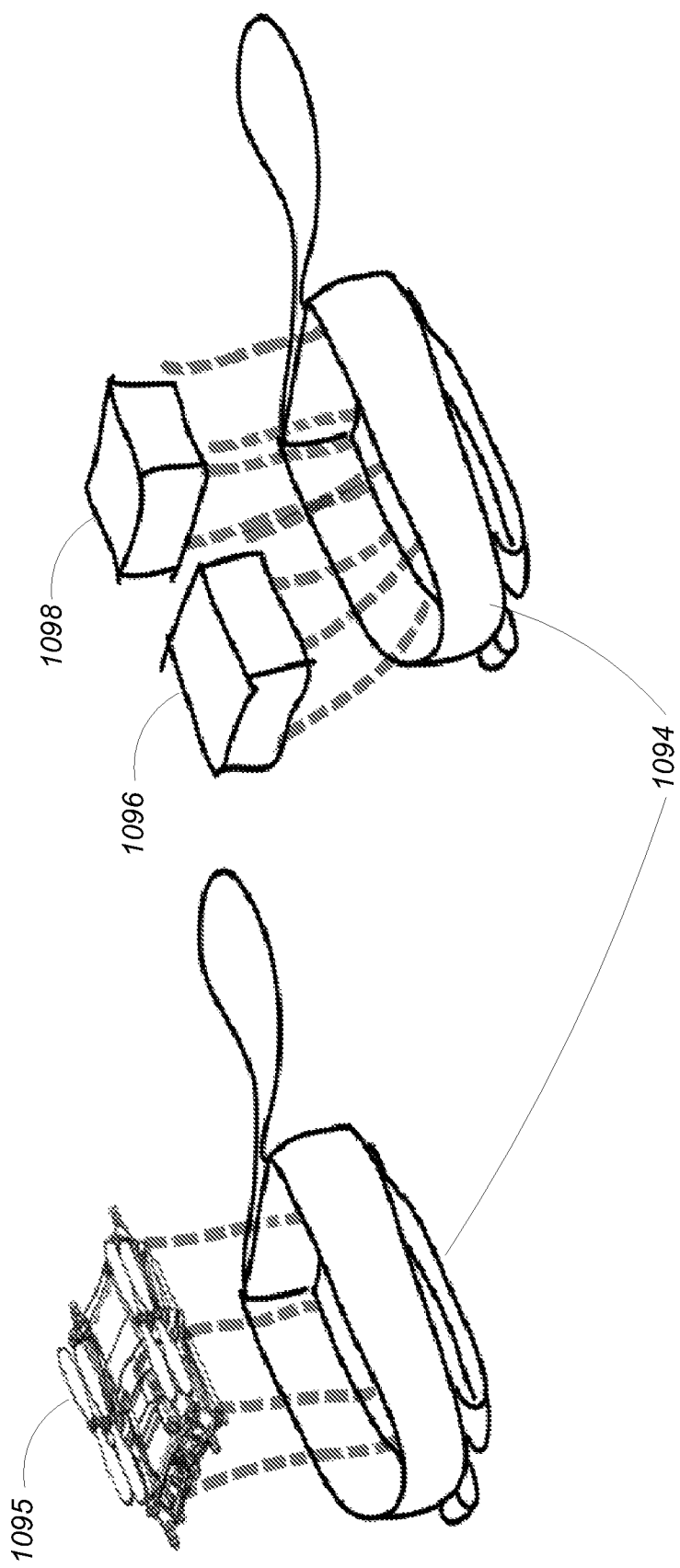
FIG. 10 is a backpack for transporting the ground powered unmanned aerial vehicle system.

Referring to FIG. 10, in some examples, the elements described above can be packaged into a human portable container such as a backpack 1094 that can easily be carried by a human. For example, the back pack can be configured to facilitate safe and secure transportation of the collapsed aerial vehicle 1095, the base station of the aerial vehicle system 1096, and the spooling apparatus 1098. In some examples, the base station 1096 and the spooling apparatus 1098 are packed first into the backpack 1094 and the collapsed aerial vehicle 1095 is packed on top of the base station 1096 and the spooling apparatus 1098.

Figure 11:
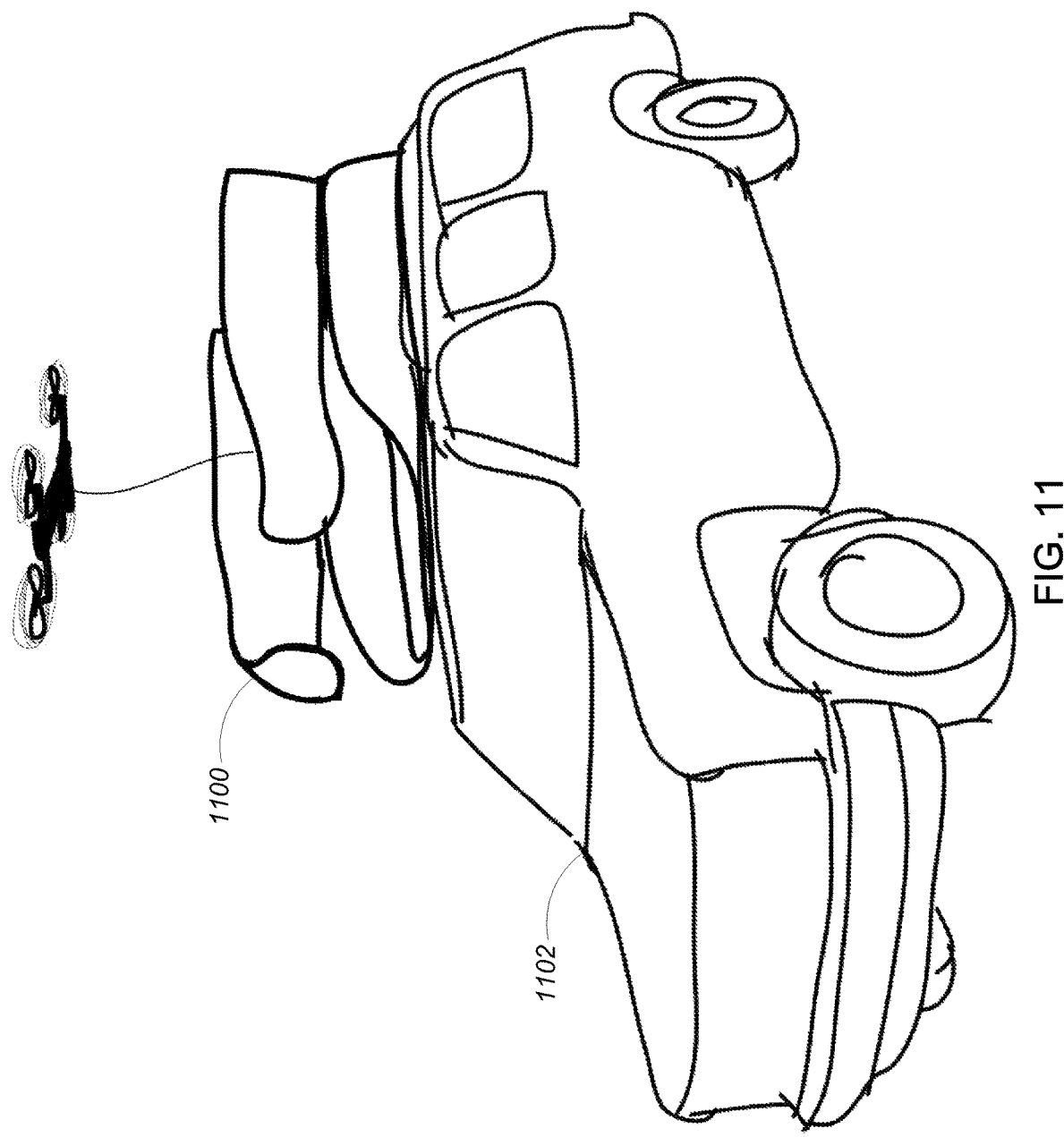
FIG. 11 is a vehicle mountable version of the ground powered or non-ground powered tethered unmanned aerial vehicle system.

Referring to FIG. 11, in some examples the elements described above can be packaged into a vehicle mountable container 1100 which can be mounted to a roof of a vehicle 1102. In other examples, the vehicle mountable container 1100 can be mounted to a bed of a pickup truck, on a flat bed trailer, on a Humvee, or on an armored personnel carrier. In some examples, the aerial vehicle system in the vehicle mountable container 1100 is configured to draw power from the vehicle 1102. In some examples, the vehicle mountable container 1100 can be used for mobile operation of the ground powered unmanned aerial vehicle system 100, with the aerial vehicle 102 following the vehicle 1102. In other examples, the vehicle mountable container can be used for stationary operation of ground powered unmanned aerial vehicle system 100.

6 Alternatives

The filament 106 is described above as an electrically conductive filament. However, in some examples, the filament is a fiber optic cable over which the control station 110 communicates with the aerial vehicle 102.

In some examples, the system of FIG. 1 includes a power conversion box between the power source 108 and the spooling apparatus 112 for converting the power produced by the power source 108 into a form that is usable by the aerial vehicle 102.

While the communication between the control station 110 and the aerial vehicle 102 is described above as taking place over a network connection, various other types of communication protocols can be used. For example, the control station 110 and the aerial vehicle 102 can communicate using point-to-point serial communications, USB communications, etc.

In some examples, the aerial vehicle 102 includes payload that includes a high definition visible light video camera and the video stream is a high definition digital video stream such as a 720p, 1080i, or 1080p video stream. In some examples, the aerial vehicle includes a payload including multicore cameras, TOF laser depth cameras, hyperspectral cameras, or multi-sensor gigapixel camera arrays. In some examples, the aerial vehicle 102 includes a night vision camera such as an active illumination video camera or a thermal imaging camera. In some examples, the aerial vehicle 102 includes both a visible light video camera and a night vision camera. In some examples, the aerial vehicle 102 includes a high resolution still camera. In some examples, other payloads can include sensors, emitters (e.g., lasers), or weapons systems.

While the above description generally describes the position sensor 227 as being located within the spooling apparatus 112, it is noted that the position sensor 227 does not need to be located within the spooling apparatus 112. For example, the position sensor 227 could be located some distance from the spooling apparatus 112

In some examples, the spooling apparatus 112 maintains a record of how much filament 106 is currently deployed and the control system 228 takes the record into account when controlling the speed and direction of rotation of the spool 224.

In some examples, the aerial vehicle 102 is configured to fly to a higher altitude to take up slack on the filament 106 in an emergency situation. In other examples, the aerial vehicle 102 includes an on-board supplementary spooling apparatus which can take up slack on the filament 106 in an emergency situation.

In some examples, the aerial vehicle 102 includes a battery which acts as reserve power for situations where the filament 102 is severed or damaged, interrupting power from the power source 108. The battery allows the aerial vehicle 102 to safely land.

In some examples, the aerial vehicle 102 includes a configurable bay for accepting custom payloads.

In some examples, the system 100, including some or all of the aerial vehicle 102, the spooler 112, and control computer 110 are connected to a communications network such one or more other computers on the communications network are connected to and can interact with the system 100 to either control it or gather and analyze data.

It is to be understood that the foregoing description is intended to illustrate and not to limit the scope of the invention, which is defined by the scope of the appended claims. Other embodiments are within the scope of the following claims.

What is claimed is:

1. An unmanned aerial vehicle system comprising:
a spooling apparatus;
a filament that is dispensed from the spooling apparatus;
a cooling apparatus that provides a cooling air flow to the spooling apparatus such that a portion of the filament wound on the spooling apparatus is cooled by the air flow;
an unmanned aerial vehicle that is connected to the spooling apparatus with the filament, the filament delivering power and flight control data to the unmanned aerial vehicle;
a control station that is electrically connected to the filament with a filament interface such that the operational data is transmitted to the unmanned aerial vehicle with the filament;
a power source that is electrically connected to the filament interface such that electrical power is delivered to unmanned aerial vehicle with the filament interface;
a tension sensor that measures tension of the filament between the spooling apparatus and the unmanned aerial vehicle;
a control system that controls dispensing and retracting of the filament with the spooling apparatus in response to measured filament tension data from the tension sensor;
a sensor mounted on the unmanned aerial vehicle that transmits data with the filament; and
wherein the spooling apparatus is mounted to a mobile vehicle such that the unmanned aerial vehicle can be operated with the filament deployed from the mobile vehicle.

2. The unmanned aerial vehicle system of claim 1 wherein the filament is configured to act as a tether for limiting a range of the aerial vehicle.

3. The unmanned aerial vehicle system of claim 1 wherein the spooling apparatus is configured to draw power from the mobile vehicle.

4. The unmanned aerial vehicle system of claim 3 further comprising a power converter between a power source of the mobile vehicle and the spooling apparatus, the power converter configured to convert power produced by the power source of the mobile vehicle for transmission to the aerial vehicle via the filament.

5. The unmanned aerial vehicle system of claim 1 wherein the control system further comprises;
a filament feeding mechanism that dispenses and retracts filament with the spooling apparatus;
one or more additional sensors that determine one or more characteristics of the filament; and
wherein the control system controls the filament feeding mechanism to feed and retract the filament based on the one or more additional characteristics of the filament.

6. The unmanned aerial vehicle system of claim 5 wherein the spooling apparatus further includes a spool such that the filament can be dispensed from the spool for retracted onto the spool, the spool comprises perforations for the air flow.

7. The unmanned aerial vehicle system of claim 6 wherein the control system is configured to maintain a record of an amount of filament dispensed from the spool and wherein the control system controls the filament feeding mechanism based at least in part on the record of the amount of filament dispensed from the spool.

8. The unmanned aerial vehicle system of claim 1 wherein data communicated between the aerial vehicle and the control station includes one or more of network data, point to point serial data, sensor data, video data, still camera data, payload control data, vehicle control data, and vehicle status data.

9. The unmanned aerial vehicle system of claim 1 wherein the aerial vehicle is collapsible.

10. The unmanned aerial vehicle system of claim 9 wherein the aerial vehicle is configured to be collapsed and stowed in a container for storage on the mobile vehicle.

11. The unmanned aerial vehicle system of claim 1 wherein the aerial vehicle is configured to adjust a flight control operation such that the aerial vehicle follows movement of the mobile vehicle.

12. The unmanned aerial vehicle system of claim 1 wherein the aerial vehicle includes a second spooling apparatus to dispense filament from the aerial vehicle.

13. The unmanned aerial vehicle system of claim 1 wherein the aerial vehicle includes a visible light camera and a night vision camera.

14. The unmanned aerial vehicle system of claim 1 wherein the mobile vehicle moves on a ground surface.

15. A tether system for controlling an unmanned aerial vehicle comprising:
an unmanned aerial vehicle;
a control station that communicates with the unmanned aerial vehicle;
a power source;
a filament coupled to the unmanned aerial vehicle, the filament providing electric power and communication between the control station and the unmanned aerial vehicle;
a filament mechanism that provides feed and retraction of the filament between the filament mechanism and the unmanned aerial vehicle;
a cooling apparatus that directs an air flow onto a portion of the filament that is wound on the filament mechanism;
a tension sensor that measures filament tension, the tension sensor generating a tension signal;
a filament controller connected to the filament mechanism, the filament controller receiving the tension signal to adjust filament tension between the filament mechanism and the unmanned aerial vehicle;
a camera mounted on the unmanned aerial vehicle, the camera transmitting image data to the control station with the filament; and
a mobile vehicle wherein the control station and the filament mechanism are mounted on the mobile vehicle such that the unmanned aerial vehicle can be operated from the mobile vehicle.

16. The system of claim 15 wherein the filament comprises a fiber optic cable.

17. The system of claim 15 wherein the unmanned aerial vehicle further comprises a battery.

18. The system of claim 15 further comprising a container on the mobile vehicle in which the unmanned aerial vehicle can be positioned.

19. The system of claim 15 further comprising a filament interface between the control station and the filament.

20. The system of claim 15 wherein the filament mechanism comprises a spooling apparatus.

21. The system of claim 15 wherein the control station transmits flight control data to the unmanned aerial vehicle with the filament.

22. The system of claim 15 wherein the unmanned aerial vehicle processes flight control data such that the unmanned aerial vehicle follows the moving mobile vehicle.

23. The system of claim 15 wherein the control station comprises a laptop computer.

24. The system of claim 15 wherein the unmanned aerial vehicle transmits global positioning system (GPS) coordinates of the unmanned aerial vehicle to the control station on the mobile vehicle.

25. The system of claim 15 wherein the filament comprises a light weight conductive element that is detachably connected to the unmanned aerial vehicle.

26. The system of claim 15 further comprising a position sensor that measures a position of the filament.

27. The system of claim 15 wherein the filament controller maintains the filament tension below a predetermined level.

28. The system of claim 15 further comprising a motor operative to feed or retract the filament in response to the filament controller.

29. The system of claim 15 wherein the tension sensor measures tension induced by wind on the filament.

30. The system of claim 15 wherein the filament mechanism comprises firmware operative to control a cross ratio of the wound filament.

31. The system of claim 15 wherein the filament and the filament tension defines an operating boundary of the aerial vehicle comprising a dome shape.

32. The system of claim 15 wherein the tension sensor detects slack in the filament and actuates the filament controller to retract a portion of the tether.

33. The system of claim 15 wherein the cooling apparatus directs air flow onto the filament through perforations in a spool.

34. An unmanned aerial vehicle system comprising:
a spooling apparatus;
an unmanned aerial vehicle that is connected to the spooling apparatus by a filament, the filament delivering power and operational data to the unmanned aerial vehicle;

a control station that delivers control data to the unmanned aerial vehicle;

a tension sensor that measures tension of the filament between the spooling apparatus and the unmanned aerial vehicle;

a filament control system that controls feed and retraction of the filament with the spooling apparatus;

a cooling apparatus that directs an air flow onto a wound portion of the filament on the spooling apparatus;

a sensor mounted on the unmanned aerial vehicle that transmits data with the filament to the control station; and wherein the spooling apparatus is mounted to a moving mobile vehicle such that the unmanned aerial vehicle can be operated with the filament deployed from the spooling apparatus on the moving mobile vehicle.

35. The unmanned aerial vehicle system of claim 34, wherein the filament control system comprises a feedback control system.

36. The unmanned aerial vehicle system of claim 34, wherein the feedback control system is a PID controller.

37. The unmanned aerial vehicle system of claim 34, wherein the cooling apparatus cools the wound portion of the filament by forcing cooled air to flow through perforations in a spooler of the spooling apparatus and over the wound portion of the filament.

38. The unmanned aerial vehicle system of claim 34, wherein the spooling apparatus comprises a cylindrical hollow spool body including:

a first end including an air intake opening through which the cooled air is forced into the hollow spool body, a second end, a cylindrical wall extending between the first end and the second end, and a plurality of through holes in the cylindrical wall, through which the cooled air exits the cylindrical hollow spool body.

39. The unmanned aerial vehicle system of claim 34, wherein the filament transmits payload data.

40. The unmanned aerial vehicle system of claim 34, the unmanned aerial vehicle further comprising an on-board camera that transmits data to the control station and a GPS receiver that communicates with the control station, wherein the unmanned aerial vehicle operates relative to the moving mobile vehicle.

41. The unmanned aerial vehicle system of claim 34, wherein the spooling apparatus is configured to draw power from the moving mobile vehicle.

42. The unmanned aerial vehicle system of claim 34, further comprising a container mounted on the moving mobile vehicle, the container including the spooling apparatus and a filament interface that connects a power source and the control station to the filament.

43. The unmanned aerial vehicle system of claim 34, the unmanned aerial vehicle further comprising a GPS receiver that provides updated GPS coordinates to follow the moving mobile vehicle and the control system is further configured to maintain a record of an amount of filament deployed from the spooling apparatus, wherein the control system controls the filament control system based at least in part of the record of the amount of filament deployed from the spooling apparatus.

* * * * *

UNITED STATES PATENT AND TRADEMARK OFFICE
CERTIFICATE OF CORRECTION

PATENT NO. : 10,507,914 B2
APPLICATION NO. : 15/041211
DATED : December 17, 2019
INVENTOR(S) : Jason S. Walker et al.

Page 1 of 1

It is certified that error appears in the above-identified patent and that said Letters Patent is hereby corrected as shown below:

In the Claims

Claim 1, Column 10, Line 51, change "to unmanned" to --to the unmanned--.

Claim 6, Column 11, Line 21, change "spool for retracted" to --spool or retracted--.

Claim 7, Column 11, Line 27, change "record of the amount" to --record on the amount--.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*